US008898380B2

(12) United States Patent
Delaney

(10) Patent No.: US 8,898,380 B2
(45) Date of Patent: Nov. 25, 2014

(54) MEMORY EFFICIENT CHECK OF RAID INFORMATION

(75) Inventor: William Patrick Delaney, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 278 days.

(21) Appl. No.: 12/808,844

(22) PCT Filed: Jan. 9, 2009

(86) PCT No.: PCT/US2009/030656
§ 371 (c)(1),
(2), (4) Date: Jun. 17, 2010

(87) PCT Pub. No.: WO2010/059255
PCT Pub. Date: May 27, 2010

(65) Prior Publication Data
US 2011/0264857 A1    Oct. 27, 2011

Related U.S. Application Data

(60) Provisional application No. 61/116,265, filed on Nov. 19, 2008.

(51) Int. Cl.
*G06F 12/08* (2006.01)
*G06F 11/10* (2006.01)
*G06F 3/06* (2006.01)

(52) U.S. Cl.
CPC .......... *G06F 11/1076* (2013.01); *G06F 3/0689* (2013.01); *G06F 2211/1057* (2013.01)
USPC ......................................... 711/114; 714/6.24

(58) Field of Classification Search
CPC ............ G06F 3/0689; G06F 11/1076–11/1096
USPC ................................. 711/144; 714/6.22–6.24
See application file for complete search history.

(56) References Cited

U.S. PATENT DOCUMENTS

| 5,123,092 | A | * | 6/1992 | Buxton et al. ................. 710/107 |
| 5,809,559 | A |   | 9/1998 | Kim |
| 6,687,872 | B2 |  | 2/2004 | Oldfield et al. |
| 7,139,873 | B1 | * | 11/2006 | Ruster et al. .................. 711/113 |
| 7,370,248 | B2 |  | 5/2008 | Tapper et al. |
| 7,437,658 | B2 |  | 10/2008 | Kobayashi |
| 2006/0206752 | A1 | * | 9/2006 | Ikeuchi et al. ..................... 714/6 |
| 2007/0180298 | A1 | * | 8/2007 | Byrne et al. ....................... 714/6 |
| 2008/0040646 | A1 |  | 2/2008 | Forhan et al. |
| 2008/0148025 | A1 | * | 6/2008 | Gopal et al. ................... 712/225 |
| 2008/0201630 | A1 | * | 8/2008 | Ikeuchi et al. ................. 714/801 |

* cited by examiner

*Primary Examiner* — April Y Blair
*Assistant Examiner* — Nicholas Simonetti
(74) *Attorney, Agent, or Firm* — Duft Bornsen & Fettig LLP

(57) ABSTRACT

Disclosed is a RAID data checking system. I/O controllers to read data RAID data from the storage devices and transfer that data to virtual memory address ranges. The P+Q checking function receives the data sent to the virtual memory address ranges. However, instead of storing the incoming data, the P+Q checking function updates intermediate values of the P and Q redundant data calculations associated with the incoming data. When all of the strips have been received, the P+Q checking function will have completed the calculation of P and Q redundant data. In this case, after all the strips and the P or Q data have been received, the P+Q checking function will hold zeroes if all the data and the P and Q data was correct and hold non-zero values if there was an error.

8 Claims, 4 Drawing Sheets

MEMORY EFFICIENT CHECK OF RAID INFORMATION

CROSS-REFERENCE TO RELATED APPLICATION

This application claims the benefit of U.S. Provisional Patent Application Ser. No. 61/116,265, entitled "Memory Efficient Check of RAID Information," filed Nov. 19, 2008, by William Patrick Delaney. The entire content of the above mentioned application is hereby specifically incorporated herein by reference for all it discloses and teaches.

BACKGROUND OF THE INVENTION

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks. These arrays may be configured in ways that provide redundancy and error recovery without any loss of data. These arrays may also be configured to increase read and write performance by allowing data to be read or written simultaneously to multiple disk drives. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID). The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY OF THE INVENTION

An embodiment of the invention may therefore comprise a system for checking RAID information, comprising: an address compare that determines a first address on a system bus corresponds to a RAID check range; a RAID P-data accumulator that stores a first result of an exclusive-OR of data stored in said RAID P-data accumulator and data received from said system bus, said data received from said system bus corresponding to data being sent to said first address on said system bus, said first address on said system bus corresponding to said RAID check range; a constant selector that, based on said first address on said system bus, selects one of a set of constants that corresponds to said data received from said system bus; and, a RAID Q-data accumulator that stores a second result of an exclusive-OR of data stored in said RAID Q-data accumulator and a third result of a Galois field multiplication of said one of said set of constants and said data received from said system bus.

An embodiment of the invention may therefore further comprise a method of checking RAID information, comprising: controlling a plurality of storage devices to provide a plurality of RAID strips, said plurality of RAID strips being sent to a plurality of virtual buffers; receiving said plurality of RAID strips; and, accumulating a plurality of P-data values and a plurality of Q-data values corresponding to each of said plurality of virtual buffers, said plurality of P-data values and said plurality of Q-data values corresponding to said plurality of RAID strips received for each of said plurality of virtual buffers.

An embodiment of the invention may therefore further comprise a system for checking RAID information, comprising: a virtual buffer compare that compares an address presented on a system bus with a plurality of virtual address buffer ranges; a selector that, in response to said address presented on said system bus corresponding to a one of said plurality of virtual address buffer ranges, selects a Galois Field constant and an accumulator buffer address; a Galois Field multiplier that performs a Galois Field multiplication on said Galois Field constant and a block of data that corresponds to said address present on said system bus; a P-data exclusive-OR accumulator that stores a P-data result of an exclusive-OR operation on said block of data and a stored P-data value corresponding to said accumulator buffer address; and, a Q-data exclusive-OR accumulator that stores a Q-data result of an exclusive-OR operation on a Galois Field multiplication result and a stored Q-data value corresponding to said accumulator buffer address.

DETAILED DESCRIPTION OF THE EMBODIMENTS

Figure 1:
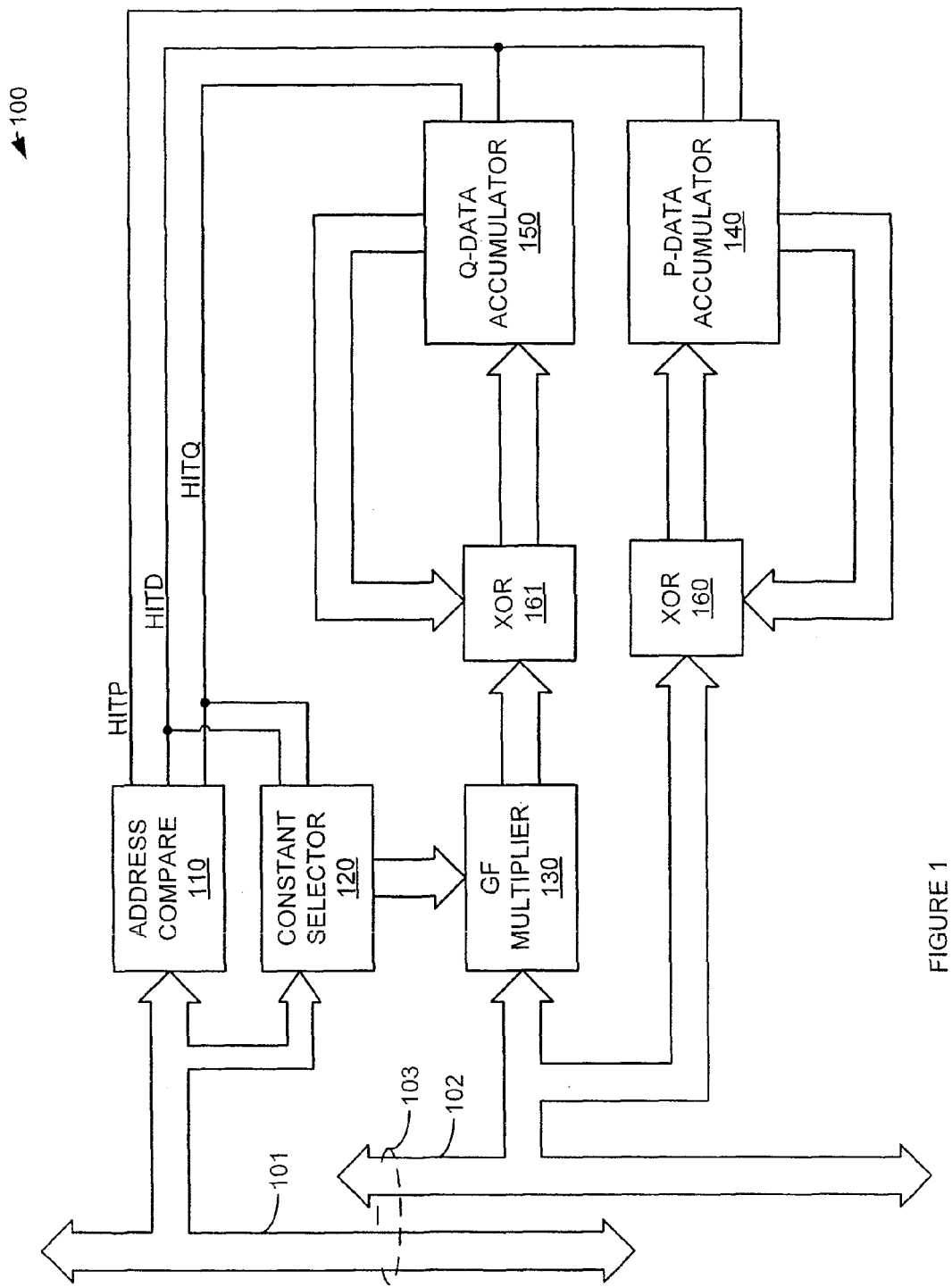
FIG. 1 is a block diagram of a system for checking RAID information.

FIG. 1 is a block diagram of a system for checking RAID information. P+Q checking system 100 comprises: address bus 101, data bus 102, address compare 110, constant selector 120, Galois field (GF) multiplier 130, P-data accumulator 140, Q-data accumulator 150, exclusive-OR (XOR) 160, and exclusive-OR 161. Collectively, address bus 101 and data bus 102 comprise system bus 103. Address bus 101 is operatively coupled to address compare 110 and constant selector 120. Data bus 102 is operatively coupled to GF multiplier 130 and XOR 160.

Address compare 110 generates three signals: HITP, HITD, and HITQ. HITD is operatively coupled to Q-data accumulator 150 and P-data accumulator 140. HITP is operatively coupled to P-data accumulator 140. HITQ is operatively coupled to Q-data accumulator 150. Address compare 110 generates HITD in response to a memory address on address bus 101 that is within a predefined data range. This predefined data range defines a block of virtual memory that P+Q checking system 100 emulates in order to receive RAID data sent from storage devices coupled to system bus 103. Address compare 110 generates HITP in response to a memory address on address bus 101 that is within a predefined P-data range. This predefined P-data range defines a block of virtual memory that P+Q checking system 100 emulates in order to receive RAID P-data sent from storage devices coupled to system bus 103. Address compare 110 generates HITQ in response to a memory address on address bus 101 that is within a predefined Q-data range. This predefined Q-data range defines a block of virtual memory that P+Q checking system 100 emulates in order to receive RAID Q-data sent from storage devices coupled to system bus 103. HITD and HITQ are also operatively coupled to constant selector 120.

RAID systems typically distribute data and redundant data over multiple storage devices. The blocks of data and redundant data that are all associated with each other are called stripes. The blocks of data that comprise a stripe on a particular disk may be referred to as a strip. For RAID-5 there is only a single redundant block. This redundant block stores the parity for the stripe. Thus, it is referred to as the P-block or P-data. Each bit in the P-data is simply the bitwise exclusive-OR (XOR) of the corresponding bits in the data strips. Thus, the P-data calculation may be expressed as:

$$P[i]=D_1[i] \otimes D_2[i] \otimes \ldots \otimes D_N[i]$$

where $D_1[i]$ is the $i^{th}$ byte within the first data strip, $D_2[i]$ is the $i^{th}$ byte within the second data strip, and so on.

For RAID-6, there are at least two redundant blocks. One is the P-block and one is called the Q-block (or Q-data). The Q-data is computed according to the formula:

$$Q[i]=(D_1[i] \cdot C_1) \otimes (D_2[i] \cdot C_2) \otimes \ldots \otimes (D_N[i] \cdot C_N)$$

where $D_1[i]$ is the $i^{th}$ byte within the first data strip, $D_2[i]$ is the $i^{th}$ byte within the second data strip, and so on. $C_1$, $C_2$, etc., are fixed constant bytes whose values are governed by the redundancy method (e.g., Reed-Solomon) being employed to generate the Q-data. These constants may be referred to as the Q-data constants. The "·" symbol is intended to represent Galois Field multiplication in $GF(2^8)$. It should be understood that by selecting appropriate values for the Q-data constants $C_1$ through $C_N$, additional blocks of Q-data may be generated. These additional blocks of Q-data allow the RAID system to detect and recover from more errors.

In an embodiment, data from a RAID array is sent directly from the storage devices to the P+Q checking system 100 without first being stored in memory. The P+Q checking system 100 is coupled to the system bus 103 to appear as memory space to I/O controllers that control the storage devices of the RAID array. Thus, existing I/O controllers may function and be controlled without modification.

RAID control software programs I/O controllers to read RAID data from the storage devices and transfer that data to virtual memory address ranges. These virtual memory address ranges are recognized by the P+Q checking system 100. The P+Q checking system 100 receives the data sent to the virtual memory address ranges. However, instead of storing the incoming data, the P+Q checking system 100 updates intermediate values of the P and Q redundant data calculations associated with the incoming data. When all of the strips have been received, the P+Q checking system 100 will have completed the calculation of P and Q redundant data. The P+Q checking system 100 may also accept P or Q data from the storage devices. In this case, after all the strips and the P or Q data have been received, the P+Q checking system 100 will hold zeroes if all the data and the P and Q data was correct. The P+Q checking system 100 will hold non-zero values if there was an error.

The P+Q checking system 100 reduces the utilization of memory for RAID-5 and/or RAID-6 validation operations. These validation operations are an important element in ensuring data integrity for RAID systems. This is particularly important when consumer class storage devices are used because they are less reliable than enterprise class devices. Using a memory based technique to perform validation operations increases memory and system bus loading. This degrades the performance of the RAID system. The P+Q checking system 100 eliminates memory accesses for the computation and/or checking of P+Q redundant data.

Constant selector 120, in response to a HITD or HITQ signal, generates Q-data constants. The Q-data constant generated is based on the address present of address bus 101. By examining certain bits on address bus 101, constant selector 120 is able to determine which data strip (i.e., $D_1$, $D_2$ etc.) is on data bus 102. Thus, constant selector 120 outputs the corresponding constant for the strip that is on data bus 102. The constant output by constant selector 120 and the data for the strip that is on data bus 102 is GF multiplied by GF multiplier 130. This operation forms the $D_x[i] \cdot C_x$ terms in the calculation of the Q-data.

The data on data bus 102 is also input to XOR 160. The other input to XOR 160 is from P-data accumulator 140. In response to a HITD or HITP signal, P-data accumulator stores the output of XOR 160 as the next value to be input to XOR 160. Thus, this operation by P-data accumulator 140 and XOR 160 form a $D_x[i] \otimes (D_y[i] \otimes \ldots \otimes D_z[i])$ operation where $D_x[i]$ is the current value on data bus 102 and $D_y[i] \otimes \ldots \otimes D_z[i]$ is the result of previous XOR operations. It should be understood that once all 1 through N data values have been XOR'd by XOR 160 and the results accumulated by P-data accumulator 140, P-data accumulator 140 will hold the result P[i]. In addition, if a stored value for the P-data is received and XOR'd by XOR 160 (e.g., in response to the HITP signal), the result stored in P-data accumulator 140 will be zero if all of the data, and the stored P-data were correct. Otherwise, the result stored in P-data accumulator 140 will be non-zero thus indicating an error.

The data output by GF multiplier 130 is input to XOR 161. The other input to XOR 161 is from Q-data accumulator 150. In response to a HITD or HITQ signal, Q-data accumulator stores the output of XOR 161 as the next value to be input to XOR 161. Thus, this operation by Q-data accumulator 150 and XOR 161 form a $(D_x[i] \cdot C_x) \otimes [(D_y[i] \cdot C_y) \otimes \ldots \otimes (D_z[i] \cdot C_z)]$ operation where $D_x[i]$ is the current value on data bus 102 and $(D_y[i] \cdot C_y) \otimes \ldots \otimes (D_z[i] \cdot C_z)$ is the result of previous XOR operations. It should be understood that once all 1 through N data values have been GF multiplied by GF multiplier 130, the result XOR'd by XOR 160, and the result of the XOR accumulated by Q-data accumulator 150, Q-data accumulator 150 will hold the result Q[i]. In addition, if a stored value for the Q-data is received, GF multiplied by a constant value that does not alter the Q-data value, and XOR'd by XOR 161 (e.g., in response to the HITQ signal), the result stored in Q-data accumulator 150 will be zero if all of the data, and the stored Q-data were correct. Otherwise, the result stored in Q-data accumulator 150 will be non-zero thus indicating an error. It should also be understood that additional GF-multipliers, XORs, and Q-data accumulators may be used to check additional Q-data blocks.

Figure 2:
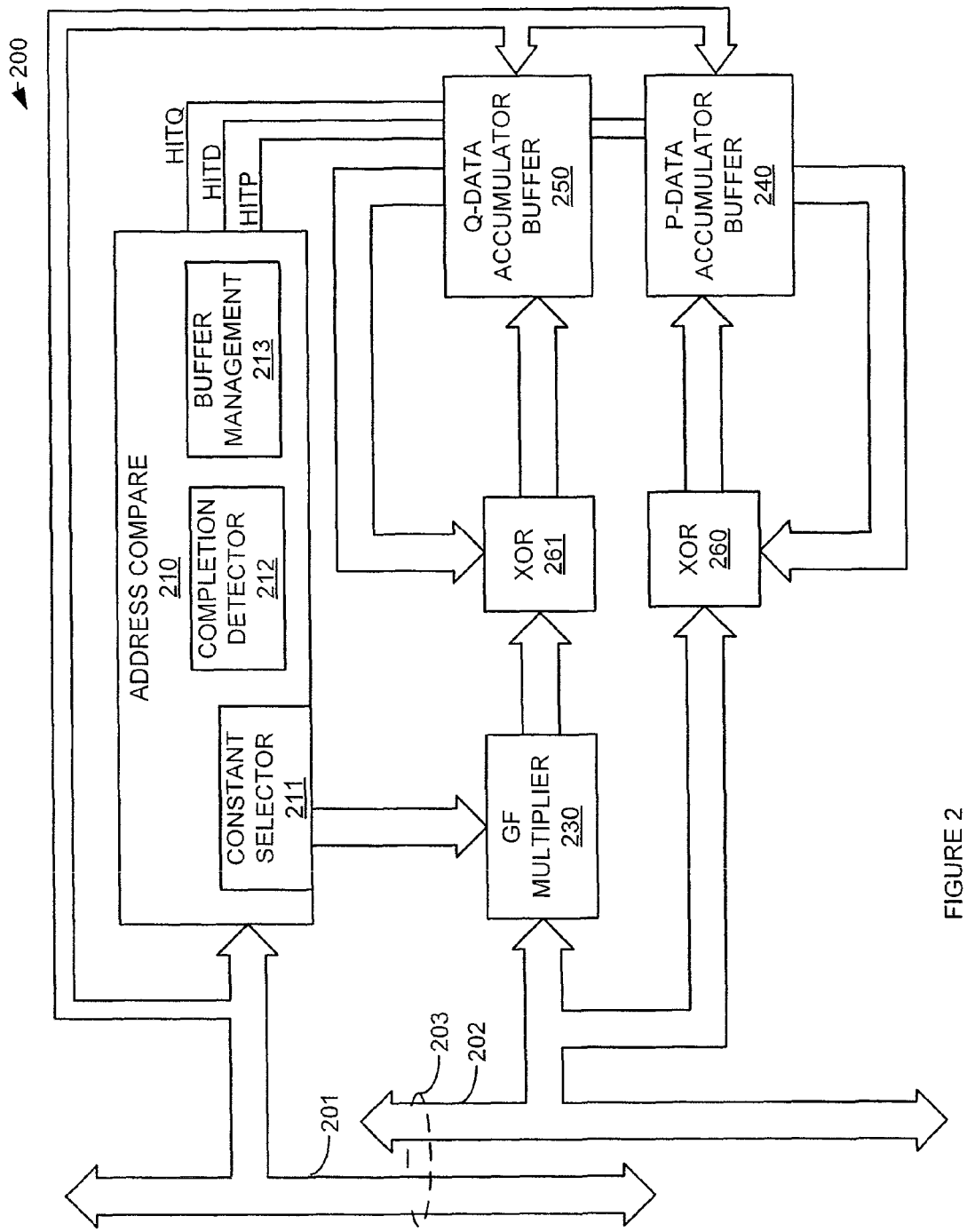
FIG. 2 is a block diagram of a system for checking blocks of RAID information.

FIG. 2 is a block diagram of a system for checking blocks of RAID information. The system illustrated in FIG. 2 functions much like the system illustrated in FIG. 1. However, the system illustrated in FIG. 2 is adapted to calculate and accumulate multiple P and Q blocks of data. P+Q checking system 200 comprises: address bus 201, data bus 202, address compare 210, Galois field (GF) multiplier 230, P-data accumulator buffer 240, Q-data accumulator buffer 250, exclusive-OR (XOR) 260, and exclusive-OR 261. Address compare 210 includes constant selector 211, completion detector 212, and buffer management 213. Collectively, address bus 201 and data bus 202 comprise system bus 203. Address bus 201 is operatively coupled to address compare 210 and thus constant selector 211. Address bus 201 is operatively coupled to Q-data accumulator buffer 250 and P-data accumulator buffer 240. Data bus 202 is operatively coupled to GF multiplier 230 and XOR 260.

Address compare 210 may generate three signals: HITP, HITD, and HITQ. HITD is operatively coupled to Q-data accumulator buffer 250 and P-data accumulator buffer 240. HITP is operatively coupled to P-data accumulator buffer 240. HITQ is operatively coupled to Q-data accumulator buffer 250. Address compare 210 generates HITD in response to a memory address on address bus 201 that is within a predefined data range. This predefined data range defines a block of virtual memory that P+Q checking system 200 emulates in order to receive RAID data sent from storage devices coupled to system bus 203. Address compare 210 generates HITP in response to a memory address on address bus 201 that is within a predefined P-data range. This predefined P-data range defines a block of virtual memory that P+Q checking system 200 emulates in order to receive RAID P-data sent from storage devices coupled to system bus 203. Address compare 210 generates HITQ in response to a memory address on address bus 201 that is within a predefined Q-data range. This predefined Q-data range defines a block of virtual memory that P+Q checking system 200 emulates in order to receive RAID Q-data sent from storage devices coupled to system bus 203.

Completion detector 212 may track the addresses on address bus 201 to determine when all of the stored data for a block has been received and accumulated by Q-data accumulator buffer 250 or P-data accumulator buffer 240. Buffer management 213 may manage the virtual buffers associated with P+Q checking system 200. For example, buffer management 213 may determine the address ranges of the virtual buffers. Buffer management may also determine the locations in Q-data accumulator buffer 250 and P-data accumulator buffer 240 that are associated with certain virtual buffer address ranges.

Constant selector 211 generates Q-data constants. The Q-data constant generated is based on the address present of address bus 201. By examining certain bits on address bus 201, constant selector 211 is able to determine which data strip (i.e., $D_1$, $D_2$ etc.) is on data bus 202. Thus, constant selector 211 outputs the corresponding constant for the strip that is on data bus 202. The constant output by constant selector 211 and the data for the strip that is on data bus 202 is GF multiplied by GF multiplier 230. This operation forms $D_x[i][j] \cdot C_x$ terms in the calculation of the Q-data for block j. Which block, j, is on data bus 202 is determined from certain bits on address bus 201.

The data on data bus 202 is also input to XOR 260. The other input to XOR 260 is from P-data accumulator buffer 240. In response to a signal from address compare 210, P-data accumulator buffer 240 stores the output of XOR 260 as the next value for block j to be input to XOR 160. P-data accumulator buffer 240 uses certain bits from address bus 201 to determine which accumulated P-data to retrieve and store. Thus, this operation by P-data accumulator buffer 240 and XOR 260 form a $D_x[i][j] \otimes (D_y[i][j] \otimes \ldots \otimes D_z[i][j])$ operation where $D_x[i][j]$ is the current value on data bus 202 and $D_y[i][j] \otimes \ldots \otimes D_z[i][j]$ is the result of previous XOR operations on the P-data accumulator buffer 240 location associated with block j. It should be understood that once all 1 through N data values for block j have been XOR'd by XOR 260 and the results accumulated by P-data accumulator buffer 240, the location in P-data accumulator buffer 240 associated with block j will hold the result P[i][j]. In addition, if a stored value for the P-data associated with block j is received and XOR'd by XOR 260 (e.g., in response to the HITP signal), the result stored in the P-data accumulator buffer 240 associated with block j will be zero if all of the data, and the stored P-data associated with block j was correct. Otherwise, the result stored in P-data accumulator buffer 240 associated with block j will be non-zero thus indicating an error.

The data output by GF multiplier 230 is input to XOR 261. The other input to XOR 261 is from Q-data accumulator buffer 250. In response to a HITD or HITQ signal, Q-data accumulator buffer 250 stores the output of XOR 261 as the next value for block j to be input to XOR 261. Thus, this operation by Q-data accumulator buffer 250 and XOR 261 form a $(D_x[i][j] \cdot C_x) \otimes [(D_y[i][j] \cdot C_y) \otimes \ldots \otimes (D_z[i][j] \cdot C_z)]$ operation where $D_x[i][j]$ is the current value on data bus 202 and $(D_y[i][j] \cdot C_y) \otimes \ldots \otimes (D_z[i][j] \cdot C_z)$ is the result of previous XOR operations on the Q-data accumulator buffer 250 location associated with block j. It should be understood that once all 1 through N data values associated with block j have been GF multiplied by GF multiplier 230, the results XOR'd by XOR 260, and the result of the XOR accumulated by Q-data accumulator buffer 250, the location in Q-data accumulator buffer 250 associated with block j will hold the result Q[i][j]. In addition, if a stored value for the Q-data associated with block j is received, GF multiplied by a constant value that does not alter the Q-data value, and XOR'd by XOR 261 (e.g., in response to the HITQ signal), the result stored in Q-data accumulator buffer 250 associated with block j will be zero if all of the data, and the stored Q-data associated with block j was correct. Otherwise, the result stored in Q-data accumulator buffer 250 associated with block j will be non-zero thus indicating an error. It should also be understood that additional GF-multipliers, XORs, and Q-data accumulators may be used to check additional Q-data blocks.

Figure 3:
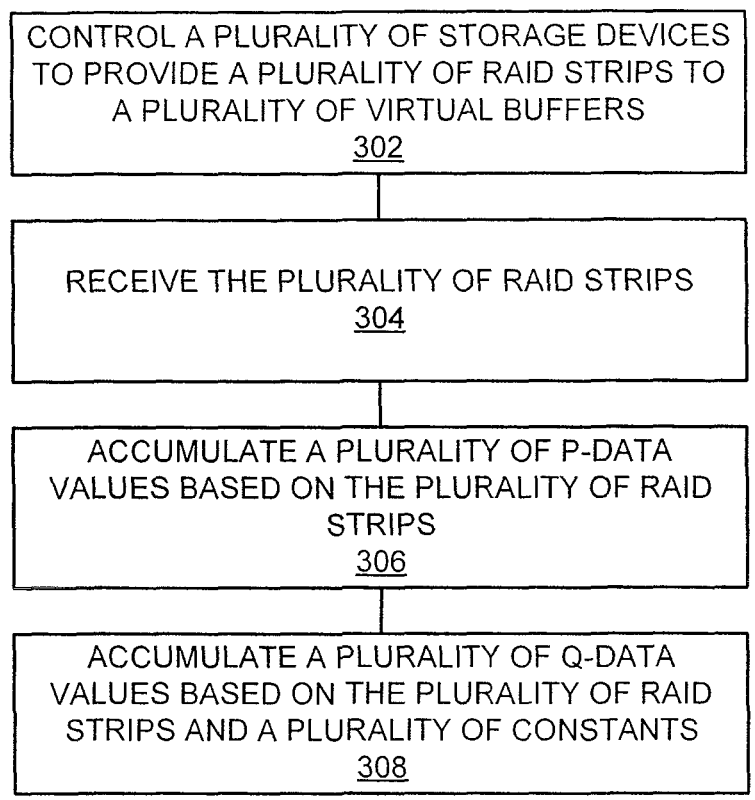
FIG. 3 is a flowchart of a method of checking RAID information.

FIG. 3 is a flowchart of a method of checking RAID information. The steps illustrated in FIG. 3 may be performed by one or more elements of P+Q checking system 100 and P+Q checking system 200.

A plurality of storage devices are controlled to provide a plurality of RAID strips to a plurality of virtual buffers (302). For example, a plurality of storage devices in a RAID array may be controlled to provide their RAID strips to an address range emulated by P+Q checking system 200. The plurality of RAID strips are received (304). For example, XOR 260 and GF multiplier 230 may received the RAID strips provided in block 302.

A plurality of P-data values are accumulated based on the plurality of RAID strips (306). For example, P-data accumulator buffer 240 may accumulate multiple P-data values based on the RAID strips received in block 304. A plurality of Q-data values are accumulated based on the plurality of RAID strips and a plurality of constants (308). For example, Q-data accumulator buffer 250 may accumulate multiple Q-data values received from GF multiplier 230. The results received from GF multiplier 230 may be based on the RAID strips received in block 304 and constants received from constant selector 211.

The methods, systems, and functions described above may be implemented with or executed by one or more computer systems. The methods described above may also be stored on a computer readable medium. Many of the elements of P+Q checking system 100 and P+Q checking system 200 may be, comprise, or include computers systems. This includes, but is not limited to address compare 110, constant selector 120, Galois field (GF) multiplier 130, P-data accumulator 140, Q-data accumulator 150, exclusive-OR (XOR) 160, exclusive-OR 160, address compare 210, Galois field (GF) multiplier 230, P-data accumulator buffer 240, Q-data accumulator buffer 250, exclusive-OR (XOR) 260, and exclusive-OR 261, constant selector 211, completion detector 212, and buffer management 213.

Figure 4:
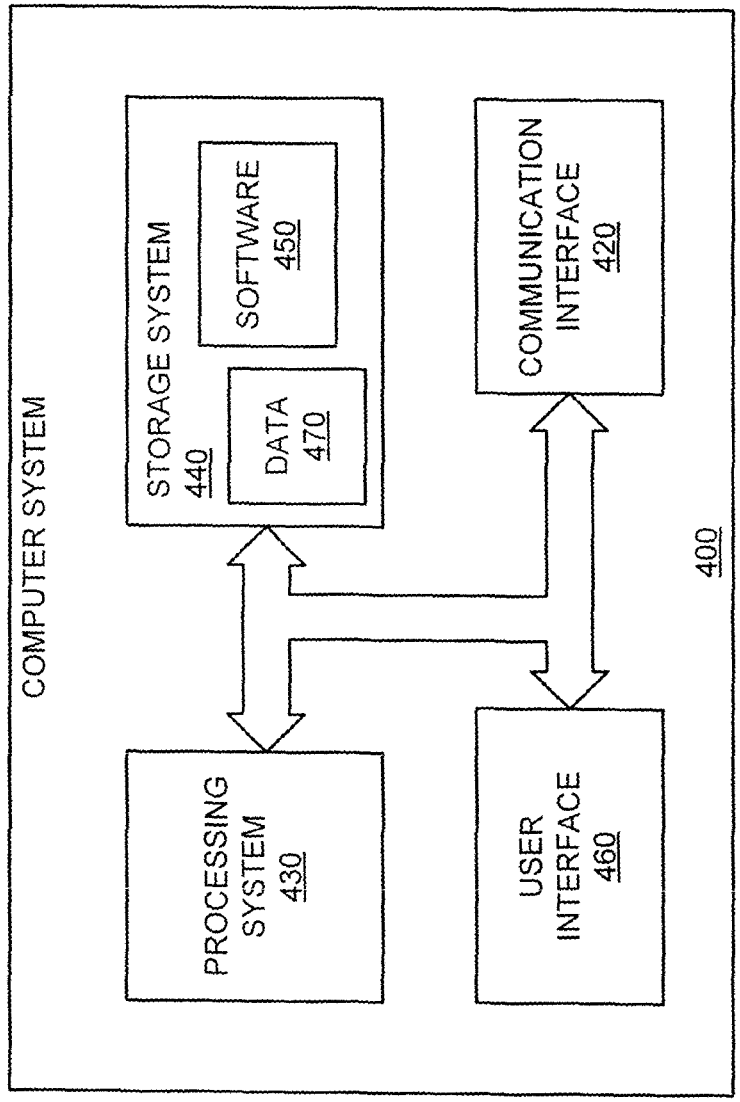
FIG. 4 is a block diagram of a computer system.

FIG. 4 illustrates a block diagram of a computer system. Computer system 400 includes communication interface 420, processing system 430, storage system 440, and user interface 460. Processing system 430 is operatively coupled to storage system 440. Storage system 440 stores software 450 and data 470. Processing system 430 is operatively coupled to communication interface 420 and user interface 460. Computer system 400 may comprise a programmed general-purpose computer. Computer system 400 may include a microprocessor. Computer system 400 may comprise programmable or special purpose circuitry. Computer system 400 may be distributed among multiple devices, processors, storage, and/or interfaces that together comprise elements 420-470.

Communication interface 420 may comprise a network interface, modem, port, bus, link, transceiver, or other communication device. Communication interface 420 may be distributed among multiple communication devices. Processing system 430 may comprise a microprocessor, microcontroller, logic circuit, or other processing device. Processing system 430 may be distributed among multiple processing devices. User interface 460 may comprise a keyboard, mouse, voice recognition interface, microphone and speakers, graphical display, touch screen, or other type of user interface device. User interface 460 may be distributed among multiple interface devices. Storage system 440 may comprise a disk, tape, integrated circuit, RAM, ROM, network storage, server, or other memory function. Storage system 440 may be a computer readable medium. Storage system 440 may be distributed among multiple memory devices.

Processing system 430 retrieves and executes software 450 from storage system 440. Processing system may retrieve and store data 470. Processing system may also retrieve and store data via communication interface 420. Processing system 450 may create or modify software 450 or data 470 to achieve a tangible result. Processing system may control communication interface 420 or user interface 470 to achieve a tangible result. Processing system may retrieve and execute remotely stored software via communication interface 420.

Software 450 and remotely stored software may comprise an operating system, utilities, drivers, networking software, and other software typically executed by a computer system. Software 450 may comprise an application program, applet, firmware, or other form of machine-readable processing instructions typically executed by a computer system. When executed by processing system 430, software 450 or remotely stored software may direct computer system 400 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for checking RAID information, comprising:
    an address compare that determines whether a first address on a system bus corresponds to a predefined data range, a predefined RAID P-data range or a predefined RAID Q-data range, wherein said address compare respectively generates one of a HITD, HITP or HITQ signal in response to the first address being within the predefined data range, the predefined RAID P-data range or the predefined RAID Q-data range;
    a RAID P-data accumulator that stores, in response to the receipt of the HITD or HITP signal, a first result of an exclusive-OR of data stored in said RAID P-data accumulator and data received from said system bus, said data received from said system bus being sent to said first address on said system bus;
    a constant selector that, in response to the receipt of the HITD or HITQ signal and based on said first address on said system bus, selects one of a set of constants that corresponds to said data received from said system bus; and,
    a RAID Q-data accumulator that stores, in response to the receipt of the HITD or HITQ signal, a second result of an exclusive-OR of data stored in said RAID Q-data accumulator and a third result of a Galois field multiplication of said one of said set of constants and said data received from said system bus.

2. The system of claim 1, further comprising a completion detector that determines when a set of data has been received from said system bus.

3. The system of claim 2, wherein said set of data comprises a plurality of data blocks that comprise a RAID data stripe that comprises RAID P-data and RAID Q-data.

4. A method of checking RAID information, comprising:
    controlling a plurality of storage devices to provide a plurality of RAID strips, said plurality of RAID strips being sent to a plurality of virtual buffers;
    receiving said plurality of RAID strips; and,
    a virtual buffer compare that compares an address presented on a system bus with a predefined data range, a predefined RAID P-data range and a predefined RAID Q-data range, wherein said virtual buffer compare respectively generates one of a HITD, HITP or HITQ signal in response to the address being within the predefined data range, the predefined RAID P-data range or the predefined RAID Q-data range;
    accumulating a plurality of P-data values, in response to the receipt of the HITD or HITP signal, corresponding to each of said plurality of virtual buffers and accumulating a plurality of Q-data values in response to the receipt of the HITD or HITQ signal corresponding to each of said plurality of virtual buffers, said plurality of P-data values and said plurality of Q-data values corresponding to said plurality of RAID strips received for each of said plurality of virtual buffers, wherein said plurality of Q-data values are based on a plurality of constants that are selected in response to the receipt of the HITD or HITQ signal and based on a corresponding which one of said plurality of virtual buffers that each of said plurality of RAID strips was sent to, the one of said plurality of virtual buffers that a RAID strip is sent to specified by the address presented on said system bus.

5. The method of claim 4, further comprising:
    controlling a storage device to provide a RAID P-data strip, said RAID P-data strip being sent to a P-data virtual buffer;
    receiving said RAID P-data strip; and, based on said result of accumulating said RAID P-data strip with at least one of said plurality of P-data values, determining an error condition.

6. The method of claim 4, further comprising:

controlling a storage device to provide a RAID Q-data strip, said RAID Q-data strip being sent to a Q-data virtual buffer;

receiving said RAID Q-data strip; and, based on said result of accumulating said RAID Q-data strip with at least one of said plurality of Q-data values, determining an error condition.

7. The method of claim 4, further comprising:

controlling a first storage device to provide a RAID P-data strip, said RAID P-data strip being sent to a P-data virtual buffer;

receiving said RAID P-data strip; and, controlling a second storage device to provide a RAID Q-data strip, said RAID Q-data strip being sent to a Q-data virtual buffer;

receiving said RAID Q-data strip; and, based on said result of accumulating said RAID Q-data strip with at least one of said plurality of Q-data values, and based on said result of accumulating said RAID P-data strip with at least one of said plurality of P-data values, determining an error condition.

8. A system for checking RAID information, comprising:

a virtual buffer compare that compares an address presented on a system bus with a predefined data range, a predefined RAID P-data range and a predefined RAID Q-data range, wherein said virtual buffer compare respectively generates one of a HITD, HITP or HITQ signal in response to the address being within the predefined data range, the predefined RAID P-data range or the predefined RAID Q-data range;

a selector that, in response to the receipt of the HITD or HITQ signal and based on said address presented on said system bus, selects a Galois Field constant and an accumulator buffer address;

a Galois Field multiplier that performs a Galois Field multiplication on said Galois Field constant and a block of data that corresponds to said address present on said system bus;

a P-data exclusive-OR accumulator that stores, in response to the receipt of the HITD or HITP signal, a P-data result of an exclusive-OR operation on said block of data and a stored P-data value corresponding to said accumulator buffer address; and, a Q-data exclusive-OR accumulator that stores, in response to the receipt of the HITD or HITQ signal, a Q-data result of an exclusive-OR operation on a Galois Field multiplication result and a stored Q-data value corresponding to said accumulator buffer address.

* * * * *